(12) United States Patent
Rangarajan et al.

(10) Patent No.: US 7,126,944 B2
(45) Date of Patent: Oct. 24, 2006

(54) ROUTING PACKETS ACROSS MULTIPLE FORWARDING ELEMENTS

(75) Inventors: Anand Rangarajan, Sunnyvale, CA (US); Sanjay Bakshi, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 867 days.

(21) Appl. No.: 09/900,435

(22) Filed: Jul. 5, 2001

(65) Prior Publication Data

US 2003/0058850 A1 Mar. 27, 2003

(51) Int. Cl.
H04L 12/28 (2006.01)

(52) U.S. Cl. ............................ 370/389; 370/401

(58) Field of Classification Search ............... 370/328, 370/338, 349, 351, 352, 389, 392, 395, 401
See application file for complete search history.

(56) References Cited

U.S. PATENT DOCUMENTS

| | | | | |
|---|---|---|---|---|
| 5,434,863 A * | 7/1995 | Onishi et al. | ............... | 370/402 |
| 5,546,379 A * | 8/1996 | Thaweethai et al. | ........ | 370/254 |
| 5,631,897 A * | 5/1997 | Pacheco et al. | ............. | 370/237 |
| 5,835,710 A * | 11/1998 | Nagami et al. | ............. | 709/250 |
| 5,905,723 A * | 5/1999 | Varghese et al. | ............ | 370/351 |
| 6,049,524 A * | 4/2000 | Fukushima et al. | ......... | 370/220 |
| 6,052,736 A * | 4/2000 | Ogle et al. | ................... | 709/244 |
| 6,252,878 B1 * | 6/2001 | Locklear et al. | ............ | 370/401 |
| 6,377,987 B1 * | 4/2002 | Kracht | ....................... | 709/220 |
| 6,552,997 B1 * | 4/2003 | Inoue et al. | ................. | 370/217 |
| 6,577,634 B1 * | 6/2003 | Tsukakoshi et al. | ... | 370/395.31 |
| 6,598,080 B1 * | 7/2003 | Nagami et al. | ............. | 709/227 |
| 6,665,297 B1 * | 12/2003 | Hariguchi et al. | .......... | 370/392 |
| 6,687,247 B1 * | 2/2004 | Wilford et al. | ............. | 370/392 |
| 6,778,532 B1 * | 8/2004 | Akahane et al. | ............ | 370/392 |
| 2001/0055317 A1 * | 12/2001 | Kajizaki et al. | ............ | 370/474 |
| 2002/0176371 A1 * | 11/2002 | Behzadi | ...................... | 370/254 |
| 2003/0016679 A1 * | 1/2003 | Adams et al. | .............. | 370/401 |

OTHER PUBLICATIONS

Anderson, Andrew, "The routing table", filed Mar. 15, 1996.*
Anderson, Andrew, "The routing table", filed Mar. 15, 1996.*
"Address Resolution Protocol (arp)," http://www.erg.abdn.ac.uk/users/gorry/course/inet-pages/arp.html (Accessed Feb. 16, 2006) 3 pgs.
Charles Hornig Symbolics Cambridge Research Center, "A Standard for the Transmission of IP Datagrams Over Ethernet Networks," http://www.ietf.org/rfc/rfc894. txt, Apr. 1984, 3 pgs.
David C. Plummer, "An Ethernet Address Resolution Protocol" or "Converting Network Protocol Address to 48. bit Ethernet Address for Transmission of Ethernet Hardware," http://www.ietf.org/rfc/rfc826.txt, Nov. 1982. 8 pgs.
Smoot Carl-Mitchell, et al., "Using ARP to Implement Transparent Subnet Gateways," http://ietf.org/rfc/rfc1027, Oct. 1987, 8 pgs.

(Continued)

Primary Examiner—Hassan Kizou
Assistant Examiner—Hong Sol Cho
(74) Attorney, Agent, or Firm—Fish & Richardson P.C.

(57) ABSTRACT

A modularized routing system includes a control element and forwarding elements, all of which are connected via a private network, for example, an Ethernet. The control element computes a routing table for each of the forwarding elements. Based on information in the routing table, a forwarding element decrements a time-to-live counter in the packet header only if the forwarding element is the first one in the routing system encountered by the packet. Accordingly, the forwarding elements preserve the behavior of a single router while using substantially the same routing protocols as the single router.

11 Claims, 3 Drawing Sheets

OTHER PUBLICATIONS

D. Awduche, et al. "Requirements for Traffic Engineering Over MPLS," http:..www.ietf.org/rfc/rfc2702.txt, Sep. 1999, 28 pgs.

B Davie, et al. "MPLS Using LDP and ATM VC Switching, " http://www.ietf.org/rfc3035.txt, Jan. 2001, 19 pgs.

L. Andersson, et al., "LDP Specification," http://www.ietf.org/rfc/rfc3036.txt, Jan. 2001, 124 pgs.

A. Conta, et al., "Use of Label Switching on Frame Relay Networks Specification." http://www.ietf.org/rfc/rfc3034.txt, Jan. 2001, 23 pgs.

E. Rosen, et al., "MPLS Label Stack Encoding,"http://www.ietf.org/rfc.rfc3032.txt, Jan. 2001, 22 pgs.

E. Rosen et al., "Multiprotocol Label Switching Architecture," http;//ietf.org/rfc/rfc3031.txt, Jan. 2001, 57 pgs.

B. Thomas, et al., "LDP Applicability, " http://www.ietf.org/rfc/rfc3037. txt, Jan. 2001, 7 pgs.

K. Nagame, et al., "VCID Notification Over ATM Link for LDP," http://www.ieft.org/rfc/rfc3038.txt, Jan. 2001, 18 pgs.

M. Suzuki, NTT, "The Assignment of the Information Field and Protocol Indentifier in the Q.2941 Generic Indentifier and Q.2957 User-to User Signaling for the Internet Protocol." http://www.ietf.org/rfc/rfc3033, Jan 2001, 24 pgs.

Y. Ohba, et al., "MPLS Loop Prevention Mechanism," http://www.ietf.org/rfc.rfc3063.txt, Feb. 2001, 42 pgs.

Y. Rekhter, "Carrying Label Information in BGP-4, " http://www.ieft.org.rfc/rfc3107.txt, May 8 pgs.

\* cited by examiner

ROUTING PACKETS ACROSS MULTIPLE FORWARDING ELEMENTS

TECHNICAL FIELD

This invention relates to a mechanism to route packets across multiple forwarding elements and preserve single hop behavior.

BACKGROUND

In recent years, network devices have begun to evolve from monolithic, highly customized, and integrated designs into modularized components. These modularized network devices, including routers and switches, allow flexible deployment of network services. For example, a single monolithic router can be replaced with a number of modularized routing elements that are fabricated on one board, or distributed across a network system. Using the modularized components, clients can determine an appropriate number of routing elements and deployment strategy for their network size requirements and cost constraints.

The modularized components can be connected together using a high-speed switching fabric. Design of the switching fabric, however, is dependent upon the number of the modularized components. Furthermore, packets transmitted on the switching fabric use proprietary protocols. Therefore, the switching fabric cannot be flexibly deployed in a network, and requires high developmental cost.

DESCRIPTION OF DRAWINGS

Like reference symbols in the various drawings indicate like elements.

DETAILED DESCRIPTION

Figure 1:
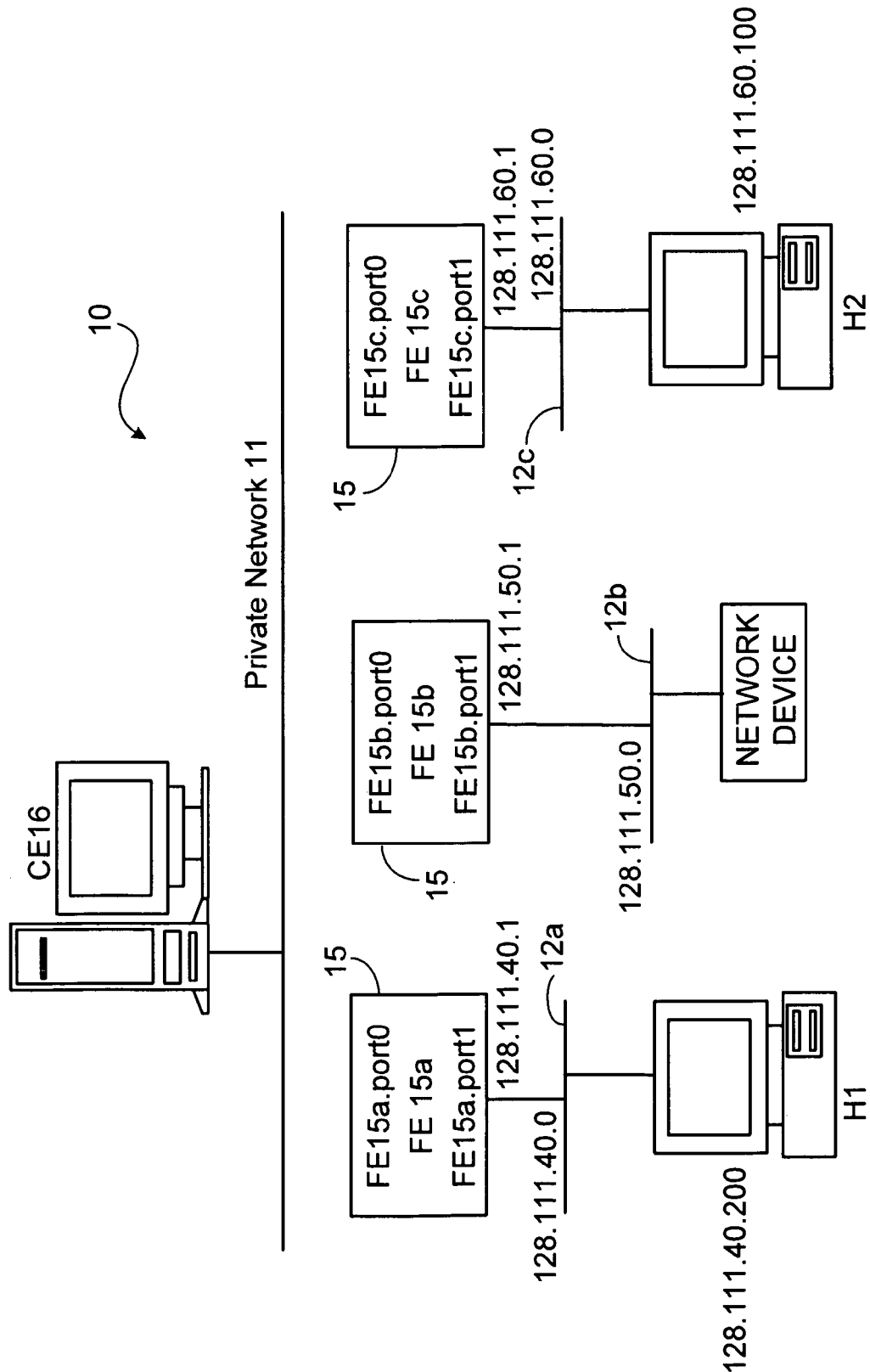
FIG. 1 illustrates a modularized routing system that preserves behavior of a single router.

Referring to FIG. 1, a control element (CE) 16 and forwarding elements (FE) 15a, 15b, and 15c are connected to a private network 11, e.g., a local area network (LAN) such as an Ethernet or a token ring LAN. Each of the FEs 15 is also connected to a network (12a, 12b, or 12c) that is remote, and not directly connected, to private network 11. Remote networks 12 provide access to host machines and other systems through network devices, e.g., routers and bridges. Through private network 11 and FEs 15, a message originating from, for example, a host machine H1 on remote network 12a, can reach another host H2 on remote network 12c.

CE 16, FEs 15, and private network 11 together form a modularized routing system 10. Similar to a single router, modularized routing system 10 routes each incoming data packet to the destination specified in the packet. However, in contrast to the single router, which typically requires a monolithic, highly customized, and integrated design, modularized routing system 10 employs modularized components (i.e., CE 16 and FEs 15). The modular design allows a flexible deployment of new network services and technology. Changes or upgrade in one component generally will not affect the others in routing system 10.

Modularized routing system 10 separates control and management functions from data forwarding functions. The control and management functions, implemented in CE 16, enable the CE to configure network parameters and IP (Internet Protocol) addresses of FEs 15. The data forwarding functions, implemented in each of the FEs 15, enable the FEs to receive a packet and forward it to a connecting node according to a routing table in the FE.

The routing table is computed at CE 16. CE 16 processes route update packets from external routers, with which the CE communicates using routing protocols, e.g., RIP (Routing Information Protocol), and OSPF (Open Shortest Path First). These route update packets carry information about the network environment in which routing system 10 is located. Furthermore, CE 16 also has the knowledge of the connections of all the FEs 15. Based on the information and knowledge, for each FE 15, CE 16 computes an appropriate routing table in a process as will be described below, and then downloads the routing table into the FE 15.

Figure 2:
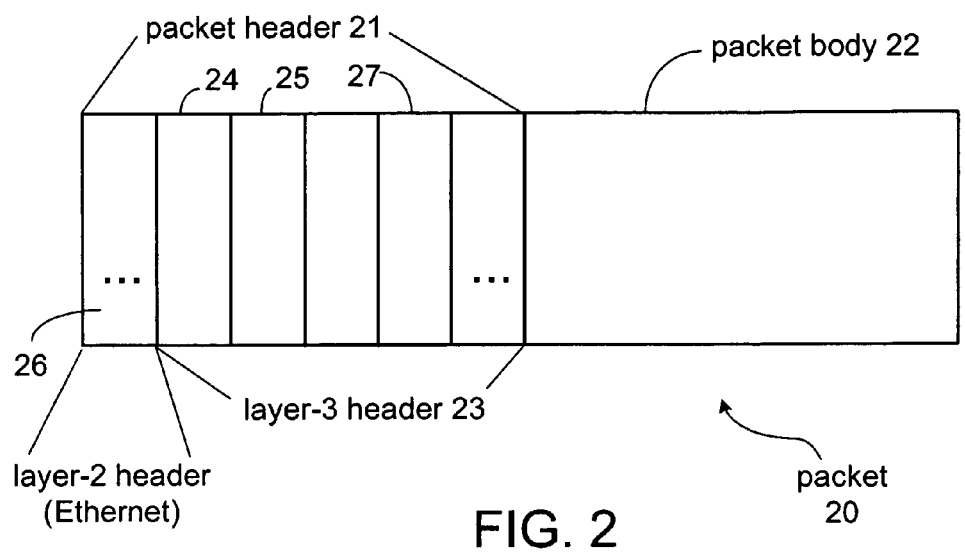
FIG. 2 is a diagram of a packet to be sent on the routing system.

To preserve the behavior of a single routing device, routing system 10 must ensure that FEs 15 coordinate with each other in a consistent manner. Referring to FIG. 2, a packet 20 is an exemplary packet transmitted through routing system 10. Packet 20 includes a packet header 21 and a packet body 22. Packet header 21 includes a layer-3 header 23 that contains a TTL (Time-To-Live) counter 24, a destination address 25, and a checksum 27. If Ethernet is used to transmit packet 20, the packet also contains an Ethernet header 26 as the layer-2 header.

When a FE 15 receives packet 20, it performs a forwarding operation. The operation includes validating checksum 27, decrementing TTL counter 24, and recalculating and updating the checksum. The value of TTL counter 24 indicates how long the packet has been on the network since it is sent from a source. TTL counter 24 is set to a pre-determined value where packet 20 originates, and the packet is discarded once the value of TTL counter 24 is decremented to zero. A zero value for TTL counter 24 indicates that network congestion has probably occurred.

Because routing system 10 is conceptualized as one single router, the routing system should only decrement TTL counter 24 once. If FEs 15 are not properly coordinated, TTL counter 24 may be decremented multiple times, once by each FE 15 that packet 20 passes through. Therefore, to preserve the behavior of a single router in the routing system 10, each FE 15 needs information to determine whether or not to decrement TTL counter 24. CE 16 can provide the information in a route table that is sent to each of the FE 15.

In one scenario, only the ingress FE 15 (i.e., the first FE encountered by a packet arriving in routing system 10) decrements TTL counter 24. Each FE 15 checks the port through which packet 20 enters the FE. If the port is a backplane port, i.e., the port that directly connected to private network 11, TTL counter 24 will not be decremented. Otherwise it is decremented. Because a packet that enters an FE through its backplane port must have passed through another FE already, the FE must not be the ingress FE. As a result, only the ingress FE decrements TTL counter 24.

If packet 20 is routed through only one FE 15, that is, the ingress FE is the same as the egress FE (i.e., the last FE encountered by a packet before the packet leaves routing system 10), TTL counter 24 will be decremented only once by the FE.

After updating TTL counter 24, the FE 15 forwards packet 20 to its destination according to a routing table. The FE's routing table is derived from a global routing table computed by CE 16.

Referring again to FIG. 1, the network addresses of remote networks 12a, 12b, and 12c are, for example, 128.111.40.0, 128.111.50.0, and 128.111.60.0, respectively. The corresponding global routing table at CE 16, in this example, is as follows.

| Network | Netmask | Gateway | Interface |
|---|---|---|---|
| 128.111.40.0 | 255.255.255.0 | * | FE15a.port1 |
| 128.111.50.0 | 255.255.255.0 | * | FE15b.port1 |
| 128.111.60.0 | 255.255.255.0 | * | FE15c.port1 |

The global routing table includes one row for each network destination. In each row, there are at least four fields. The first field is a network field that stores a network address to which routing system 10 has access. The second field is a netmask field, which can be "ANDed" with destination address 25 in packet header 21 to compute a network address. The third field is a gateway, which contains an ID of an egress FE. If the gateway field contains an indicator "*", it indicates that the owner of the routing table (here, routing system 10) is directly connected to the network address of that row. The fourth field is an interface field that contains a port through which routing system 10 is directly connected to the network address of that row. The port (i.e., port1) is also called an egress-port of an FE 15.

CE 16 modifies the global routing table before it is sent to each FE 15. CE 16 modifies the table on a row-by-row basis. For the FE 15 to which the table will be sent, no change is made to a row if the egress-port (i.e., port1) of that FE is present in the interface field of that row. If another FE's egress-port is in that row, CE 16 changes the gateway field and the interface field in that row as follows.

1. The gateway field is changed to the FE that is directly connected to the network address of that row (i.e., the egress-FE for the network address); and
2. The interface field is changed to the backplane-port (i.e., port0) of the FE that will receive the table.

According to the example of FIG. 1, the routing table that CE 16 sends to FE 15a is:

| Network | Netmask | Gateway | Interface |
|---|---|---|---|
| 128.111.40.0 | 255.255.255.0 | * | FE15a.port1 |
| 128.111.50.0 | 255.255.255.0 | FE15b | FE15a.port0 |
| 128.111.60.0 | 255.255.255.0 | FE15c | FE15a.port0 |

The routing table for FE 15b is:

| Network | Netmask | Gateway | Interface |
|---|---|---|---|
| 128.111.40.0 | 255.255.255.0 | FE15a | FE15b.port0 |
| 128.111.50.0 | 255.255.255.0 | * | FE15b.port1 |
| 128.111.60.0 | 255.255.255.0 | FE315c | FE15b.port0 |

The routing table for FE 15c is:

| Network | Netmask | Gateway | Interface |
|---|---|---|---|
| 128.111.40.0 | 255.255.255.0 | FE15a | FE15c.port0 |
| 128.111.50.0 | 255.255.255.0 | FE15b | FE15c.port0 |
| 128.111.60.0 | 255.255.255.0 | * | FE15c.port1 |

After packet 20 is received at an FE 15, the FE performs a route lookup operation in its routing table, and a forwarding operation according to its routing table. The FE 15 either sends packet 20 directly to its destination address 25, or to a gateway to which the destination address is connected. The FE 15 can perform these operations without any modification on the existing routing protocols.

An example of a pseudo code for modifying the global routing table and sending the modified tables to FEs 15 is as follows. In the code, FE-LIST is a list of the FEs 15 in routing system 10, GlobalRT is the global routing table, and RT is the routing table to be sent to an FE 15.

```
UpdateRoutingTable ( )  {
    for (FE in FE-LIST)    {
        RT = GlobalRT;          /* make a copy of the global routing table*/
        for (each entry "rtentry" in RT) {
            if (egress-port NOT present in FE) {
                rtentry.gateway  = egress-FE;
                rtentry.interface = FE.backplane-port;
            }
        }
        send RT to FE;
    }
}
```

An example of a pseudo code for routing a packet is as follows:

```
RoutePacket(Packet packet) {
    if (packet.ingress-port != backplane-port)
        decrement TTL;
    perform route-lookup;
    send packet to the gateway/destination;
}
```

Figure 3:
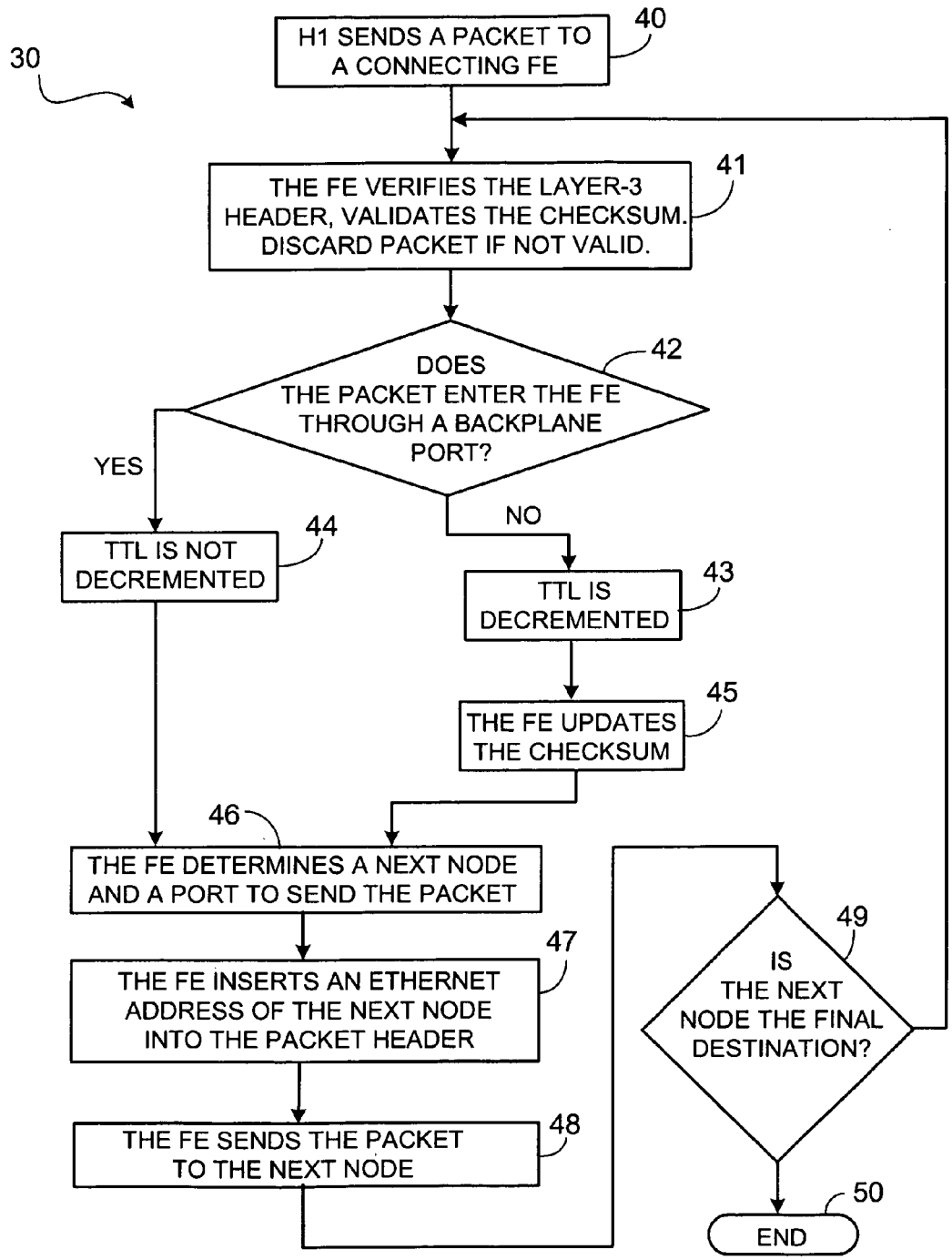
FIG. 3 is a flow diagram of a process for sending a packet through the routing system.

Referring to FIG. 3, a process 30 for routing packet 20 from a first host (H1) to a second host (H2) is shown. H1 is directly connected to FE 15a via network 12a, while H2 is directly connected to FE 15c via network 12c.

Initially, H1 sends packet 20 to FE 15a (block 40). FE 15a first verifies layer-3 header 23 of packet 20, for example, by checking its version number, and validates checksum 27 (block 41). Packet 20 will be discarded if a failure occurs during the verification and validation. Subsequently, FE 15a determines whether or not packet 20 enters the FE through a backplane port (FE15a.port0), i.e., the port that is directly connected to private network 11 (block 42). Because packet 20 enters through FE15a.port1, FE 15a is the ingress FE and therefore it decrements TTL counter 24 (block 43). FE 15a also calculates a new checksum 27 as required by the change in the TTL counter value, and updates checksum 27 according to the calculation (block 45). FE 15a then looks up in its routing table an appropriate node and a port to send packet 20 (block 46). According to the routing table, FE 15a determines that packet 20 should be sent to FE 15c through port FE15a.port0.

To send packet 20 over private network 11 to FE 15c, FE 15a first determines an address of FE 15c on the private network. If private network 11 is an Ethernet, the address to be determined by FE 15a is an Ethernet address. FE 15a can obtain the Ethernet address by using a communication protocol to, e.g., ARP (Address Resolution Protocol). The ARP defines a request procedure for a host to obtain the Ethernet address of a destination, and a respond procedure for the destination to reply. Other appropriate protocols can be applied if private network 11 is a different type of LAN. After FE 15a obtains the Ethernet address of H2, it inserts the address into Ethernet header 26 of packet 20 (block 47). FE 15a then sends packet 20 to FE 15c (block 48).

If the node that receives packet 20 is the final destination of the packet (block 49), process 40 terminates (block 50). Otherwise, operations at blocks 41–48 are repeated. However, because packet 20 enters FE 15c from its backplane port FE15c.port0, TTL counter 24 is not decremented (block 44), and therefore block 45 is skipped. At block 46, FE 15c does a route lookup in its routing table, and determines that the packet should be sent to H2 through port FE15c.port1. Assume that network 12c is also an Ethernet. FE 15c then determines the Ethernet address of H2, completes Ethernet header 26 (block 47), and sends packet 20 to H2 (block 48). Because H2 is the final destination (block 49), process 30 terminates (block 50).

The process of FIG. 3 may be implemented in hardware, software, or a combination of the two. The process may be implemented in computer programs executing on programmable computers or other machines that each include a processor, a storage medium readable by the processor (including volatile and non-volatile memory and/or storage components), at least one input device, and one or more output devices.

Each such program may be implemented in a high level procedural or object-oriented programming language to communicate with a computer system. However, the programs can be implemented in assembly or machine language. The language may be a compiled or an interpreted language.

Each computer program may be stored on a storage medium/article (e.g., CD-ROM, hard disk, or magnetic diskette) that is readable by a general or special purpose programmable computer for configuring and operating the computer when the storage medium or device is read by the computer to perform the process. The process may also be implemented as a machine-readable storage medium, configured with a computer program, where, upon execution, instructions in the computer program cause a machine to operate in accordance with the process.

Te invention is not limited to the specific hardware and software described herein. The invention is not limited to the specific data packet shown in FIG. 2. That is, fields 24, 25, etc. may not actually be in the order shown in the figure.

Accordingly, other embodiments are within the scope of the following claims.

What is claimed is:

1. A system for routing a data packet between external networks, comprising:
    a control element for managing routing tables;
    forwarding elements, each receiving one of the routing tables from the control element, and forwarding the data packet according to a received routing table and a destination address in the data packet; and
    an intra-routing network that connects the control element and the forwarding elements;
    wherein the forwarding elements decrement a time-to-live counter in the data packet if the data packet is received from one of the external networks, and do not decrement the time-to-live counter in the data packet if the data packet is received from the intra-routing network.

2. The system of claim 1, wherein the intra-routing network comprises a local area network.

3. The system of claim 1, wherein the forwarding elements are distributed across the intra-routing network.

4. The system of claim 1, wherein, for each of the external networks a routing table received by a forwarding element includes an interface port of the forwarding element through which an external network is accessible by the forwarding element.

5. The system of claim 1, wherein, for each of the external networks, a routing table received by a forwarding element includes information about a gateway to which an external network is directly connected.

6. A method of routing a data packet between external networks, comprising:
    receiving, at a forwarding element, a routing table from a control element via an intra-routing network;
    receiving the data packet at the forwarding element;
    decrementing a time-to-live counter in the data packet if the data packet is received from one of the external networks, and not decrementing the time-to-live counter in the data packet if the data packet is received from the intra-routing network; and
    forwarding the data packet according to the routing table and a destination address in the data packet.

7. The method of claim 6, further comprising, at the control element, modifying an interface port field for each of the external networks in the routing table before sending the routing table to the forwarding element.

8. The method of claim 7, wherein modifying includes specifying, in the interface port field, a port of the forwarding element through which an external network is accessible by the forwarding element.

9. The method of claim 6, further comprising, at the control element, changing a gateway field for each of the external networks in the routing table before sending the routing table to the forwarding element.

10. The method of claim 9, wherein changing includes specifying, in the gateway field, one of plural forwarding elements to which an external network is directly connected.

11. An article comprising a machine-readable medium that stores instructions for routing data between external networks, the instructions causing a machine associated with a forwarding element to:
    receive, at the forwarding element, a routing table from a control element via an intra-routing network;
    receive the data packet at the forwarding element;
    decrement a time-to-live counter in data packet if the data packet is received from one of the external networks, and not decrement the time-to-live counter in the data packet if the data packet is received from the intra-routing network; and
    forward the data packet according to the routing table and a destination address in the data packet.

* * * * *